(12) United States Patent
Xu et al.

(10) Patent No.: US 12,380,597 B2
(45) Date of Patent: Aug. 5, 2025

(54) TARGET TRACKING METHOD FOR PANORAMA VIDEO, READABLE STORAGE MEDIUM AND COMPUTER EQUIPMENT

(71) Applicant: ARASHI VISION INC., Shenzhen (CN)

(72) Inventors: Rui Xu, Shenzhen (CN); Wenjie Jiang, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 476 days.

(21) Appl. No.: 17/791,570

(22) PCT Filed: Jan. 8, 2021

(86) PCT No.: PCT/CN2021/070922
§ 371 (c)(1),
(2) Date: Jul. 8, 2022

(87) PCT Pub. No.: WO2021/139787
PCT Pub. Date: Jul. 15, 2021

(65) Prior Publication Data
US 2023/0036905 A1    Feb. 2, 2023

(30) Foreign Application Priority Data
Jan. 9, 2020 (CN) .......................... 202010023864.0

(51) Int. Cl.
*G06T 7/73* (2017.01)
*G06T 7/60* (2017.01)
(Continued)

(52) U.S. Cl.
CPC .................. *G06T 7/74* (2017.01); *G06T 7/60* (2013.01); *G06V 10/225* (2022.01);
(Continued)

(58) Field of Classification Search
CPC ............ G06T 7/74; G06T 2207/10024; G06T 2207/10016; G06T 7/60; G06V 2201/07;
(Continued)

(56) References Cited

U.S. PATENT DOCUMENTS 11,422,568 B1 * 8/2022 Thomas ............... G05D 1/0274
2011/0116684 A1 5/2011 Coffman et al.
(Continued)

FOREIGN PATENT DOCUMENTS

CN 107564034 A 1/2018
CN 109003290 A * 12/2018
(Continued)

OTHER PUBLICATIONS

Liu, Wei, et al. "Ssd: Single shot multibox detector." Computer Vision ECCV 2016: 14th European Conference, Amsterdam, The Netherlands, Oct. 11, 14, 2016, Proceedings, Part I 14. Springer International Publishing, 2016. (Year: 2016).*
(Continued)

*Primary Examiner* — John Villecco
*Assistant Examiner* — Alexander John Rodgers
(74) *Attorney, Agent, or Firm* — XSENSUS LLP (57) ABSTRACT

The present application is applicable to the field of video processing. Provided are a target tracking method for a panoramic video, a readable storage medium, and a computer device. The method comprises: using a tracker to track and detect a target to be tracked to obtain a predicted tracking position of said target in the next panoramic video frame, calculating the reliability of the predicted tracking position, and using an occlusion detector to calculate an occlusion score of the predicted tracking position; determining whether the reliability of the predicated tracking position is greater than a preset reliability threshold value, and determining whether the occlusion score of the predicted
(Continued)

tracking position is greater than a preset occlusion score threshold value; and using a corresponding tracking strategy according to the reliability and the occlusion score. By means of the present application, whether a tracking failure is caused by the loss of a target or occlusion can be determined, such that a corresponding tracking recovery strategy can be used, and tracking can be automatically recovered when tracking fails, thereby achieving the effect of performing tracking continuously for a long time. In addition, the method of the present invention has a low operation complexity and a good real-time performance.

18 Claims, 4 Drawing Sheets

(51) Int. Cl.
  *G06V 10/22* (2022.01)
  *G06V 10/26* (2022.01)
  *G06V 10/56* (2022.01)
  *G06V 20/40* (2022.01)

(52) U.S. Cl.
  CPC ............ *G06V 10/267* (2022.01); *G06V 10/56* (2022.01); *G06V 20/41* (2022.01); *G06T 2207/10016* (2013.01); *G06T 2207/10024* (2013.01); *G06V 2201/07* (2022.01)

(58) Field of Classification Search
  CPC .... G06V 10/225; G06V 10/267; G06V 20/41; G06V 10/56
  See application file for complete search history.

(56) References Cited

U.S. PATENT DOCUMENTS

| | | | | |
|---|---|---|---|---|
| 2016/0004909 | A1* | 1/2016 | Mei | G06T 7/207 |
| | | | | 382/103 |
| 2016/0342837 | A1* | 11/2016 | Hong | G06T 3/40 |
| 2017/0039443 | A1* | 2/2017 | Zheng | G06F 16/583 |
| 2017/0068863 | A1* | 3/2017 | Rattner | G06V 40/10 |
| 2019/0073775 | A1* | 3/2019 | Lam | G06V 20/00 |
| 2020/0077383 | A1* | 3/2020 | Zhang | H04L 1/0003 |
| 2020/0082157 | A1* | 3/2020 | Susskind | G06V 40/169 |
| 2020/0097756 | A1* | 3/2020 | Hashimoto | G06V 10/25 |
| 2021/0150694 | A1* | 5/2021 | Pohl | G06F 18/2431 |
| 2021/0166440 | A1* | 6/2021 | Yin | G06T 3/047 |
| 2022/0016765 | A1* | 1/2022 | Ku | G05B 19/4155 |
| 2022/0343236 | A1* | 10/2022 | Daub | G06Q 10/0635 |
| 2024/0267588 | A1* | 8/2024 | Xie | G06T 7/38 |

FOREIGN PATENT DOCUMENTS

| | | |
|---|---|---|
| CN | 110136171 A | 8/2019 |
| CN | 110570448 A | 12/2019 |
| WO | 2019041519 A | 3/2019 |

OTHER PUBLICATIONS

Comparison of tracking techniques on 360-degree videos Tzu-wei, mau-Tsuen Yang, Application Sciences ISSN 2076-3417.
Adaptive correlation filtering algorithm for video target tracking based on multi feature fusion Yifei Fan, et; the eleventh international conference on advanced computational inteliegence.

* cited by examiner

TARGET TRACKING METHOD FOR PANORAMA VIDEO, READABLE STORAGE MEDIUM AND COMPUTER EQUIPMENT

TECHNICAL FIELD

The present application relates to the field of video processing, and in particular, relates to a target tracking method for panoramic video, a readable storage medium and a computer equipment.

BACKGROUND

Panoramic videos can enable users to watch videos at any viewing angle within the photographing angle range of a panoramic camera. A flat panel display can only display one of the viewing angles of the panoramic video at a certain moment when the user watches the panoramic video. Thus, when the user wants to continuously watch a specific target, he/she needs to control the flat panel display to rotate the viewing angle because of the disappearing of the target at the current viewing angle, and therefore, the operation is troublesome. Moreover, when the position of a target in which the user is interested constantly changes in the panoramic video, the user needs to constantly adjust the viewing angle along with the rotation of the target, which is not only troublesome to operate, but also makes the user feel dizzy.

SUMMARY

The present application discloses a target tracking method for panoramic video. The method includes following steps:

S101: performing target detection on a current panoramic video frame where a target for tracking needs to be determined to acquire a target to be tracked;

S102: initializing a tracker and an occlusion detector, taking a bounding box of the target to be tracked as a target tracking box of the tracker, and taking the category of the target to be tracked as the tracking target category of the tracker;

S103: tracking and detecting the target to be tracked by the tracker to obtain a predicted tracking position of the target to be tracked in the next panoramic video frame, calculating the confidence of the predicted tracking position, and calculating an occlusion score of the predicted tracking position by the occlusion detector;

S104: determining whether the confidence of the predicted tracking position is greater than a preset confidence threshold, and determining whether the occlusion score of the predicted tracking position is greater than a preset occlusion score threshold;

in response to the confidence of the predicted tracking position greater than the preset confidence threshold, tracking the target to be tracked according to the predicted tracking position of the target to be tracked;

in response to the confidence of the predicted tracking position less than the preset confidence threshold, and the occlusion score of the predicted tracking position greater than the preset occlusion score threshold, detecting the category of the target and target detection boxes in the next panoramic video frame, re-determining a predicted tracking box according to the category of the target, the target detection boxes and tracking information in the tracker, and replacing the target tracking box of the tracker with the predicted tracking box to perform tracking through the predicted tracking box; and/or, in response to the confidence of the predicted tracking position less than the preset confidence threshold, and the occlusion score of the predicted tracking position less than the preset occlusion score threshold, detecting the category of the target and target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker.

Further, after the step of tracking the target to be tracked according to the predicted tracking position of the target to be tracked, the method further includes:

returning to S103 every preset time interval in the process of target tracking.

Further, the step of detecting the category of the target and target detection boxes in the next panoramic video frame, re-determining a predicted tracking box according to the category of the target, the target detection boxes and tracking information in the tracker, and replacing the target tracking box of the tracker with the predicted tracking box to perform tracking through the predicted tracking box includes:

S1041: performing target detection on the next panoramic video frame, detecting the target detection boxes and the category of the target, screening the target detection boxes according to screening conditions, and taking the target detection boxes meeting the screening conditions as first candidate target boxes, wherein the screening conditions include: the category of the target detected being consistent with the tracking target category in the tracker; the size difference between the detected target detection box and the target tracking box of the tracker being within a preset size threshold range; and Euclidean distance difference between the detected target detection box and the target tracking box of the tracker being within a preset Euclidean threshold range;

S1042: respectively calculating the response graph and the confidence of the first candidate target boxes by the initialized relevant filter of the tracker, and calculating occlusion scores of the first candidate target boxes by the occlusion detector, and screening out the first candidate target boxes of which the confidence is greater than the preset confidence threshold and the occlusion score is less than the preset occlusion score threshold as second candidate target boxes;

S1043: among the second candidate target boxes, selecting the second candidate target box with the largest response value in the response graph and with no occlusion as the predicted tracking box, replacing the target tracking box of the tracker with the predicted tracking box, and performing tracking through the predicted tracking box.

Further, after S1042, the method further includes:

determining whether a false detection occurs according to an intersection over union IOU value of the second candidate target box and the target tracking box of the tracker, and in response to the false detection occurred, regarding an occlusion recovery as a failure, and the step of detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker is executed.

Further, the step of detecting the category of the target and target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker includes:

S1051: performing target detection on the next panoramic video frame, detecting the target detection boxes and the category of the target, and taking the target detection boxes of which the category of the detected target is consistent with the tracking target category in the tracker as third candidate target boxes;

S1052: calculating IOU values of the third candidate target boxes and the target tracking box of the tracker, and taking the third candidate target box with the largest IOU value as the predicted tracking box, and proceeding to S1053; and in response to the IOU values less than a preset IOU threshold, regarding the tracking recovery as a failure, and returning to S101 to re-perform detecting and tracking;

S1053: taking the position and size of the predicted tracking box as the initialization position and size for the restart of the tracker to restart the tracker, and regarding the tracking recovery as successful.

Further, before S1052, the method further includes:

S1054: determining whether the false detection occurred, in response to the false detection occurred, executing S1055, and in response to the false detection not occurred, executing S1052;

S1055: selecting the third candidate target boxes with the smallest size difference as fourth candidate target boxes according to the size difference between the third candidate target boxes and the target tracking box of the tracker;

S1056: selecting the fourth candidate target box with the smallest distance as the predicted tracking box according to Euclidean distances between the fourth candidate target boxes and the target tracking box of the tracker, and proceeding to S1053; in response to the Euclidean distances greater than a preset Euclidean distance threshold, regarding the tracking recovery as a failure, and returning to S101 to re-perform detecting and tracking.

The present application discloses a computer equipment. The computer equipment includes: one or more processors; a memory; and one or more computer programs, the processor and the memory being connected by a bus, wherein the one or more computer programs are stored in the memory and are configured to be executed by the one or more processors, the computer program, when executed by the processor, enables the processor to execute the steps of the target tracking method for panoramic video as described above.

The present application discloses a panoramic camera. The panoramic camera includes:

one or more processors;
a memory; and
one or more computer programs, the processor and the memory being connected by a bus, wherein the one or more computer programs are stored in the memory and are configured to be executed by the one or more processors, and the computer program, when executed by the processor, enables the processor to execute the steps of the target tracking method for panoramic video as described above.

DETAILED DESCRIPTION

In order to make objectives, technical solutions and beneficial effects of the present application clearer, the present application will be further described in detail with reference to attached drawings and embodiments. It shall be appreciated that, the specific embodiments described herein are only used for explaining the present application, and are not intended to limit the present application.

In order to illustrate the technical solutions described in the present application, the following description is made with reference to specific embodiments.

Figure 1:
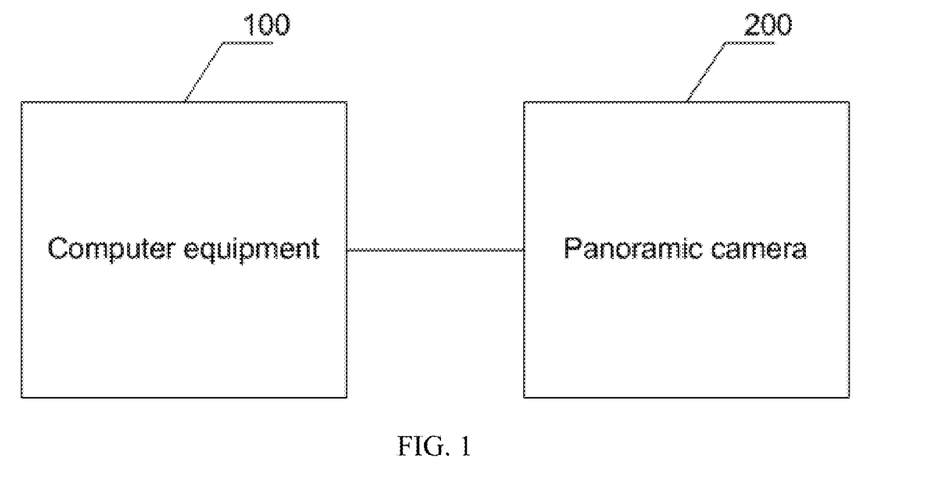
FIG. 1 is a schematic view of an application scenario of a target tracking method for panoramic video according to an embodiment of the present application.

Referring to FIG. 1, the application scenario of a target tracking method for panoramic video according to an embodiment of the present application includes a computer equipment 100 and a panoramic camera 200 connected with each other. At least one application program can be executed in the computer equipment 100 and the panoramic camera 200. The computer equipment 100 may be a desktop computer, a mobile terminal or the like. The mobile terminal includes a mobile phone, a tablet computer, a notebook computer, a personal digital assistant or the like. The computer equipment 100 or the panoramic camera 200 tracks the target in the panoramic video by executing the target tracking method for panoramic video according to an embodiment of the present application.

Figure 2:
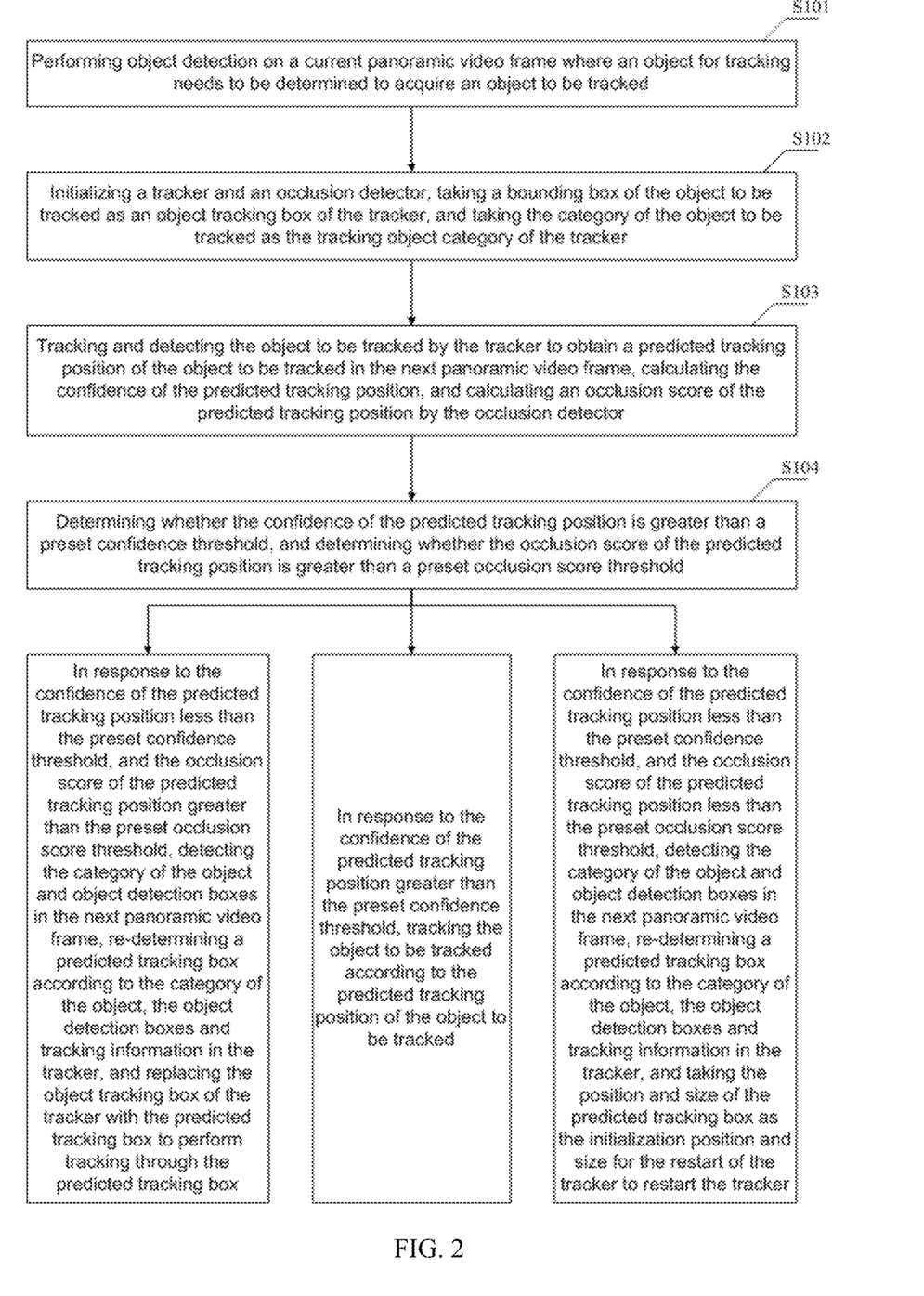
FIG. 2 is a flowchart diagram of a target tracking method for panoramic video according to an embodiment of the present application.

Please refer to FIG. 2, which is a flowchart diagram of a target tracking method for panoramic video according to an embodiment of the present application. This embodiment mainly takes the case where the target tracking method for panoramic video is applied to a computer equipment or a panoramic camera as an example for illustration. The target tracking method for panoramic video according to an embodiment of the present application includes the following steps:

S101: performing target detection on a current panoramic video frame where a target for tracking needs to be determined to acquire a target to be tracked.

In an embodiment of the present application, S101 may specifically include:

acquiring the target to be tracked and determining the category of the target to be tracked by adopting a target detection algorithm to perform target detection on the current panoramic video frame where a target for tracking needs to be determined.

After acquiring the target to be tracked, the method may further include:

identifying the target to tracked by a bounding box on the panoramic video frame, for example, identifying the target to be tracked by a rectangular box, an annular coil and other bounding boxes of arbitrary shapes.

The target to be tracked may be selected by a user in the panoramic video frame or automatically selected by a target detection algorithm. The target to be tracked includes but not limited to people, animals, vehicles and other targets. The target detection algorithm includes but not limited to a Single Shot Multi-Box Detector (SSD) algorithm, Region-Convolutional Neural Networks (R-CNN) series algorithms, and You Only Look Once (YOLO) series algorithms or the like in deep learning.

S102: initializing a tracker and an occlusion detector, taking a bounding box of the target to be tracked as a target tracking box of the tracker, and taking the category of the target to be tracked as the tracking target category of the tracker.

In an embodiment of the present application, the step of initializing the tracker includes:

S1021: acquiring the area where the bounding box of the target to be tracked is located in the current panoramic video frame;

S1022: performing boundary expanding on all boundaries of the area where the bounding box is located according to a preset expansion size to generate an image block;

S1023: taking the image block as a target tracking search area, taking the bounding box of the target to be tracked as the target tracking box, initializing the foreground size and background size of the target tracking search area, and performing size normalization; wherein the foreground size is the size of the target tracking box, and the background size is the size of the image block;

S1024: initializing parameters of a relevant filter, and initializing the foreground information and background information related to a color feature of the target tracking search area. The relevant filter is a relevant filter for online learning; wherein the foreground information is the color feature related information of the target tracking box, and the background information is the color feature related information of the image block.

The step of initializing the occlusion detector includes:

initializing the foreground size and the background size of the target tracking search area in the occlusion detector, and performing size normalization;

calculating occlusion scores of the foreground at the initialization time respectively as the reference for subsequent occlusion detection, wherein the occlusion score of the foreground is the occlusion score of the target tracking box.

S103: tracking and detecting the target to be tracked by the tracker to obtain a predicted tracking position of the target to be tracked in the next panoramic video frame, calculating the confidence of the predicted tracking position, and calculating an occlusion score of the predicted tracking position by the occlusion detector.

In an embodiment of the present application, the step of tracking and detecting the target to be tracked by the tracker to obtain a predicted tracking position of the target to be tracked in the next panoramic video frame may specifically include the following steps:

S1031: generating a feature graph by extracting histogram of oriented gradient (HOG) features and color features of the image block;

S1032: generating a response graph by filtering the feature graph with the relevant filter;

S1033: acquiring the position corresponding to the maximum value in the response graph as the predicted tracking position of the target to be tracked in the next panoramic video frame.

In an embodiment of the present application, the step of calculating the confidence of the predicted tracking position may specifically include:

calculating the index average peak-to correlation energy (APCE) for the confidence of the predicted tracking position by the following formula:

$$APCE = \frac{\|F_{max} - F_{min}\|^2}{mean\left(\sum_{w,h}(F_{w,h} - F_{min})^2\right)},$$

wherein $F_{max}$ is the maximum value in the response graph, $F_{min}$ is the minimum value in the response graph, and $F_{w,h}$ is the value of the coordinate (w, h) position in the response graph.

In some embodiments, other indexes of the prior art may also be adopted as the index for the confidence of the predicted tracking position. These other indexes for example include: I. the maximum value in the response graph; II. Peak to Sidelobe Ratio (PSR) in MOSSE, which is calculated by the relevant filtering peak and the mean and standard deviation of sidelobes outside the 11*11 peak window; III. the maximum response peak of each channel; IV. the ratio between the second and first main modes in the response graph, which reflects the expressive force of the main modes in each channel response, but it is necessary to perform maximum value detection first.

The calculation of the occlusion score $OS_{raw}(n)$ by detecting the tracked target using the occlusion detector according to the predicted tracking position may be performed specifically by the following formula:

$$OS_{raw}(n) = -\frac{\sum_{i=x_n}^{x_n+w_n}\sum_{j=y_n}^{y_n+h_n} L(target \mid H(i, j))}{w_n h_n}$$

wherein, $w_n$ is the width value of the image block, $h_n$ is the height value of the image block, $x_n$ and $y_n$ are the x-axis coordinate value and y-axis coordinate value of the upper left corner of the image block, the image coordinates in HSV color space are expressed with (i, j), and L(target|H(i,j)) is logarithmic likelihood function:

$$L(target \mid H(i, j)) = \log\left(\frac{P(H(i, j) \mid target) + \varepsilon}{P(H(i, j) \mid background) + \varepsilon}\right).$$

wherein P(H(i,j)|target) represents the probability that the HUE value belongs to the pixel of the target tracking box in the quantized graph, P(H(i,j)|background) represents the probability that the HUE value belongs to the pixel of other backgrounds except for the target tracking box in the quantized graph, ε is a constant, and the denominator of the formula is prevented from being 0.

S104: determining whether the confidence of the predicted tracking position is greater than a preset confidence threshold, and determining whether the occlusion score of the predicted tracking position is greater than a preset occlusion score threshold;

In response to the confidence of the predicted tracking position greater than the preset confidence threshold, tracking the target to be tracked according to the predicted tracking position of the target to be tracked;

In response to the confidence of the predicted tracking position less than the preset confidence threshold, and the occlusion score of the predicted tracking position greater than the preset occlusion score threshold, detecting the category of the target and target detection boxes in the next panoramic video frame, re-determining a predicted tracking box according to the category of the target, the target detection boxes and tracking information in the tracker, and replacing the target tracking box of the tracker with the predicted tracking box to perform tracking through the predicted tracking box; and/or, In response to the confidence of the predicted tracking position less than the preset confidence threshold, and the occlusion score of the predicted tracking position less than the preset occlusion score threshold, detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker.

In an embodiment of the present application, after the step of tracking the target to be tracked according to the predicted tracking position of the target to be tracked, the method may further include:

returning to S103 every preset time interval in the process of target tracking, so that the problem of tracking loss caused by tracking drift due to deformation of the tracked target can be eliminated.

In response to the confidence less than the preset confidence threshold, and the occlusion score greater than the preset score threshold, it means that the tracked target is occluded, and the specific step of re-determining a predicted tracking box according to the category of the target and the target detection boxes detected in the current panoramic video frame and the tracking information in the tracker, and replacing the target tracking box of the tracker with the predicted tracking box to perform tracking and detecting through the predicted tracking box so as to obtain the predicted tracking position of the target to be tracked in the next panoramic video frame includes:

S1041: performing target detection on the next panoramic video frame, detecting the target detection boxes and the category of the target, screening the target detection boxes according to screening conditions, and taking the target detection boxes meeting the screening conditions as first candidate target boxes, wherein the screening conditions include: I. the category of the target detected being consistent with the tracking target category in the tracker; II. the size difference between the detected target detection box and the target tracking box of the tracker being within a preset size threshold range; III. Euclidean distance difference between the detected target detection box and the target tracking box of the tracker being within a preset Euclidean threshold range;

S1042: respectively calculating the response graph and the confidence of the first candidate target boxes by the initialized relevant filter of the tracker, and calculating occlusion scores of the first candidate target boxes by the occlusion detector, and screening out the first candidate target boxes of which the confidence is greater than the preset confidence threshold and the occlusion score is less than the preset occlusion score threshold as second candidate target boxes;

S1043: among the second candidate target boxes, selecting the second candidate target box with the largest response value in the response graph and with no occlusion as the predicted tracking box, replacing the target tracking box of the tracker with the predicted tracking box, and performing tracking through the predicted tracking box (however, the tracker does not need to be reinitialized, and the relevant filter parameters previously trained, updated and maintained are still valid, and the tracking recovery is successful).

After S1042, the method may further include the following steps:

determining whether the false detection occurs according to an intersection over union (IOU) value of the second candidate target box and the target tracking box of the tracker, and in response to the false detection occurred, regarding the occlusion recovery at this time as a failure, and the step of detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker is executed.

IOU is a standard to measure the accuracy of detecting a corresponding target in a specific data set. IOU is a simple measurement standard, and any task to get a prediction range (bounding boxes) in the output can be measured by IOU.

In response to the confidence less than the preset confidence threshold and the occlusion score less than the preset score threshold, it means that the tracked target is lost, and the step of re-determining a predicted tracking box according to the category of the target and the target detection boxes detected in the current panoramic video frame and the tracking information in the tracker, and taking the predicted tracking box as the initialization position and size for the restart of the tracker to restart the tracker specifically includes:

S1051: performing target detection on the next panoramic video frame, detecting the target detection boxes and the category of the target, and taking the target detection boxes of which the category of the detected target is consistent with the tracking target category in the tracker as third candidate target boxes;

S1052: calculating IOU values of the third candidate target boxes and the target tracking box of the tracker, and taking the third candidate target box with the largest IOU value as the predicted tracking box, and proceeding to S1053; and in response to the IOU values less than a preset IOU threshold, regarding the tracking recovery at this time as a failure, and returning to S101 to re-perform detecting and tracking;

S1053: taking the position and size of the predicted tracking box as the initialization position and size for the restart of the tracker to restart the tracker, and regarding the tracking recovery as successful.

Before S1052, the method may further include:

S1054: determining whether the false detection occurred, in response to the false detection occurred, executing S1055, and otherwise, executing S1052;

S1055: selecting the third candidate target boxes with the smallest size difference as fourth candidate target boxes according to the size difference between the third candidate target boxes and the target tracking box of the tracker;

S1056: selecting the fourth candidate target box with the smallest distance as the predicted tracking box according to Euclidean distances between the fourth candidate target boxes and the target tracking box of the tracker, and proceeding to S1053; in response to the Euclidean distances greater than a preset Euclidean distance threshold, regarding the tracking recovery at this time as a failure, and returning to S101 to re-perform detecting and tracking.

Figure 3:
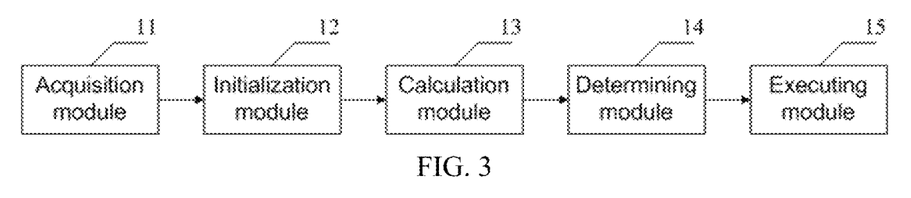
FIG. 3 is a schematic view of a target tracking device for panoramic video according to an embodiment of the present application.

Referring to FIG. 3, a target tracking device for panoramic video according to an embodiment of the present application may be a computer program or a piece of program code running in a computer equipment or a panoramic camera. For example, the target tracking device for panoramic video is an application software. The target tracking device for panoramic video may be used to execute the corresponding steps in the target tracking method for panoramic video according to the embodiments of the present application. The target tracking device for panoramic video according to an embodiment of the present application includes:

an acquisition module 11, being configured to perform target detection on a current panoramic video frame where a target for tracking needs to be determined to acquire a target to be tracked;

an initialization module 12, being configured to initialize a tracker and an occlusion detector, take a bounding box of the target to be tracked as a target tracking box of the tracker, and take the category of the target to be tracked as the tracking target category of the tracker;

a calculation module 13, being configured to track and detect the target to be tracked by the tracker to obtain a predicted tracking position of the target to be tracked in the next panoramic video frame, calculate the confidence of the predicted tracking position, and calculate an occlusion score of the predicted tracking position by the occlusion detector;

a determining module 14, being configured to determine whether the confidence of the predicted tracking position is greater than a preset confidence threshold, and determine whether the occlusion score of the predicted tracking position is greater than a preset occlusion score threshold;

an executing module 15, being configured to track the target to be tracked according to the predicted tracking position of the target to be tracked in response to the confidence greater than the preset confidence threshold of the predicted tracking position;

detect the category of the target and target detection boxes in the next panoramic video frame, and re-determine a predicted tracking box according to the category of the target, the target detection boxes and tracking information in the tracker, and replace the target tracking box of the tracker with the predicted tracking box to perform tracking through the predicted tracking box, in response to the confidence less than the preset confidence threshold of the predicted tracking position, and the occlusion score of the predicted tracking position greater than the preset occlusion score threshold; and/or, detect the category of the target and the target detection boxes in the next panoramic video frame, re-determine a predicted tracking box according to the category of the target, the target detection boxes and the tracking information in the tracker, and take the position and size of the predicted tracking box as the initialization position and size for the restart of the tracker to restart the tracker, in response to the confidence of the predicted tracking position less than the preset confidence threshold, and the occlusion score of the predicted tracking position less than the preset occlusion score threshold.

The target tracking device for panoramic video according to an embodiment of the present application belongs to the same concept as the target tracking method for panoramic video provided according to an embodiment of the present application, the specific implementation process thereof is detailed in the full text of the specification, and this will not be further described herein.

An embodiment of the present application further discloses a computer-readable storage medium storing a computer program, and the computer program, when executed by a processor, executes the steps of the target tracking method for panoramic video according to an embodiment of the present application.

Figure 4:
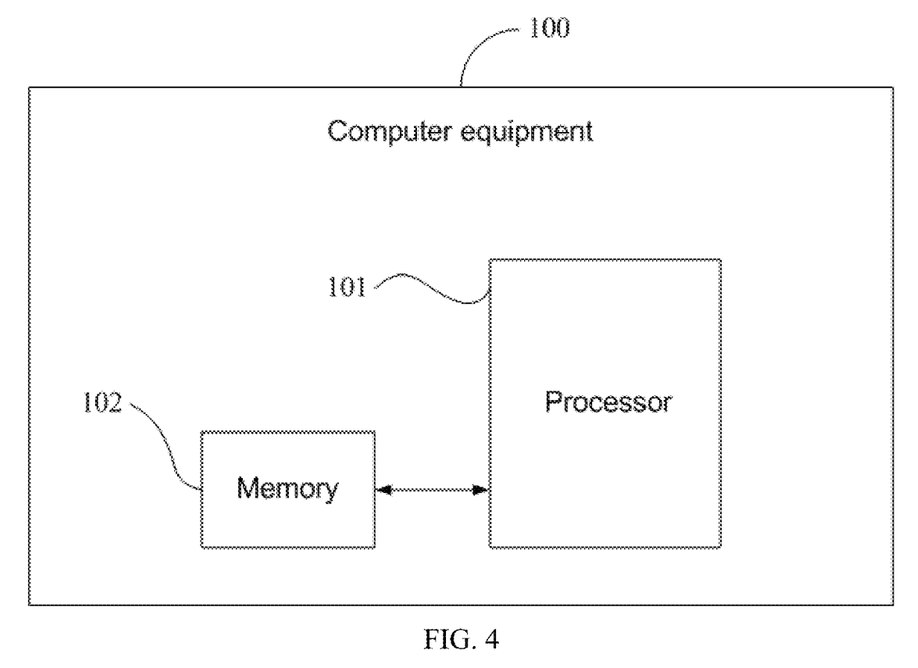
FIG. 4 is a block diagram of a specific structure of a computer equipment according to an embodiment of the present application.

FIG. 4 shows a block diagram of a specific structure of a computer equipment provided according to an embodiment of the present application, and the computer equipment may be the computer equipment shown in FIG. 1. A computer equipment 100 includes one or more processors 101, a memory 102, and one or more computer programs, wherein the processor 101 and the memory 102 are connected by a bus, and the one or more computer programs are stored in the memory 102, and are configured to be executed by the one or more processors 101. The computer program, when executed by the processor 101, enables the processor 101 to execute the steps of the target tracking method for panoramic video according to an embodiment of the present application.

The computer equipment may be a desktop computer, a mobile terminal or the like. The mobile terminal includes a mobile phone, a tablet computer, a notebook computer, a personal digital assistant or the like.

Figure 5:
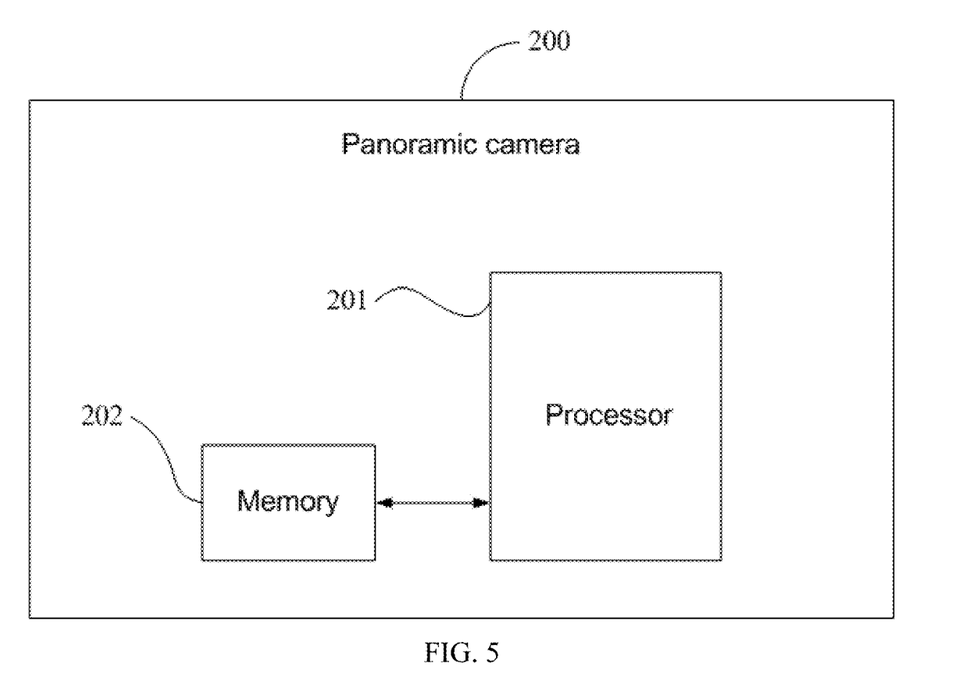
FIG. 5 is a block diagram of a specific structure of a panoramic camera according to an embodiment of the present application.

FIG. 5 shows a block diagram of a specific structure of a panoramic camera according to an embodiment of the present application, and the panoramic camera may be the panoramic camera shown in FIG. 1. A panoramic camera 200 includes one or more processors 201, a memory 202, and one or more computer programs, wherein the processor 201 and the memory 202 are connected by a bus, and the one or more computer programs are stored in the memory 202, and are configured to be executed by the one or more processors 201. The computer program, when executed by the processor 201, enables the processor 201 to execute the steps of the target tracking method for panoramic video according to an embodiment of the present application.

In the present application, the target to be tracked is tracked and detected by the tracker to obtain a predicted tracking position of the target to be tracked in the next panoramic video frame, the confidence of the predicted tracking position is calculated, the tracked target is detected by the occlusion detector according to the predicted tracking position to calculate an occlusion score; in response to the confidence greater than the preset confidence threshold, the target to be tracked is tracked according to the predicted tracking position of the target to be tracked; in response to the confidence less than the preset confidence threshold, and the occlusion score greater than the preset score threshold, a predicted tracking box is re-determined according to the category of the target and the target detection boxes detected in the current panoramic video frame and the tracking information in the tracker, and the target tracking box of the tracker is replaced with the predicted tracking box to perform tracking and detecting through the predicted tracking box so as to obtain the predicted tracking position of the target to be tracked in the next panoramic video frame; in response to the confidence less than the preset confidence threshold, and the occlusion score less than the preset score threshold, a predicted tracking box is re-determined according to the category of the target and the target detection boxes detected in the current panoramic video frame and the tracking information in the tracker, and the predicted tracking box is taken as the initialization position and size for the restart of the tracker to restart the tracker. Therefore, the present application can distinguish whether the reason of tracking failure is the loss or occlusion of the target, and then adopt the corresponding tracking recovery strategy, thereby achieving the effect of automatic recovery after tracking failure and long-term tracking. As such, the method of the present application has low computational complexity and great instantaneity.

It shall be appreciated that, steps in various embodiments of the present application are not necessarily executed in sequence in the order indicated by the step numbers. Unless explicitly stated herein, the execution of these steps is not strictly limited in order, and these steps may be executed in other orders. Moreover, at least a part of the steps in various embodiments may include multiple sub-steps or stages, and these sub-steps or stages are not necessarily completed at the same time, but may be executed at different times. Moreover, these sub-steps or stages are not necessarily executed sequentially, but may be executed with other steps or at least a part of sub-steps or stages of other steps in turns or alternately.

As shall be appreciated by those of ordinary skill in the art, all or part of the processes for implementing the embodiments of the methods as described above may be completed by instructing related hardware through a computer program, and the computer program may be stored in a non-volatile computer-readable storage medium. The program, when being executed, may include the processes of the embodiments of the methods as described above. Any reference to memory, storage, database or other media used in the embodiments provided according to the present application may include nonvolatile and/or volatile memories. The nonvolatile memories may include a read only memory (ROM), a programmable ROM (PROM), an electrically programmable ROM (EPROM), an electrically erasable programmable ROM (EEPROM) or a flash memory. The volatile memories may include a random access memory (RAM) or an external cache memory. By way of illustration rather than limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a memory bus (Rambus) direct RAM (RDRAM) and a direct Rambus dynamic RAM (DRDRAM) and a Rambus dynamic RAM (RDRAM) or the like.

The technical features of the above embodiments may be arbitrarily combined. To make the description concise, not all possible combinations of the technical features in the above embodiments are described. However, combinations of these technical features shall all be considered as within the scope recorded in this specification as long as there is no contradiction in the combinations.

The above embodiments only show several implementations of the present invention, and the description of the embodiments are specific and detailed, but it should not be construed as limitation to the scope of the patent for the present invention. It shall be noted that for those of ordinary skill in the art, several modifications and improvements can be made therein without departing from the concept of the present invention, and all these modifications and improvements belong to the scope claimed in the present invention. Therefore, the scope claimed in the patent for the present invention shall be governed by the claims appended.

What is claimed is:

1. A target tracking method for panoramic video comprising:
    S101: performing target detection on a current panoramic video frame where a target for tracking needs to be determined to acquire a target to be tracked;
    S102: initializing a tracker and an occlusion detector, taking a bounding box of the target to be tracked as a target tracking box of the tracker, and taking a category of the target to be tracked as a tracking target category of the tracker;
    S103: tracking and detecting the target to be tracked by the tracker to obtain a predicted tracking position of the target to be tracked in the next panoramic video frame, calculating a confidence of the predicted tracking position, and calculating an occlusion score of the predicted tracking position by the occlusion detector; and
    S104: determining whether the confidence of the predicted tracking position is greater than a preset confidence threshold, and determining whether the occlusion score of the predicted tracking position is greater than a preset occlusion score threshold,
    in response to the confidence of the predicted tracking position is less than the preset confidence threshold, and the occlusion score of the predicted tracking position is greater than the preset occlusion score threshold, detecting the category of the target and target detection boxes in the next panoramic video frame, re-determining a predicted tracking box according to the category of the target, the target detection boxes and tracking information in the tracker, and replacing the target tracking box of the tracker with the predicted tracking box to perform tracking through the predicted tracking box;
    in response to the confidence of the predicted tracking position less than the preset confidence threshold, and the occlusion score of the predicted tracking position less than the preset occlusion score threshold, detecting the category of the target and target detection boxes in the next panoramic video frame, re-determining a predicted tracking box according to the category of the target, the target detection boxes and tracking information in the tracker, and taking the position and size of the predicted tracking box as the initialization position and size for the restart of the tracker to restart the tracker,
    wherein the detecting the category of the target and target detection boxes in the next panoramic video frame, re-determining the predicted tracking box according to the category of the target, the target detection boxes and tracking in the tracker, and replacing the target tracking box of the tracker with the predicted tracking box to perform tracking through the predicted tracking box comprises:

S1041: performing target detection on the next panoramic video frame, detecting the target detection boxes and the category of the target, screening the target detection boxes according to screening conditions, and taking the target detection boxes meeting the screening conditions as first candidate target boxes, wherein the screening conditions comprise: the category of the target detected being consistent with the tracking target category in the tracker; the size difference between the detected target detection box and the target tracking box of the tracker being within a preset size threshold range; and Euclidean distance difference between the detected target detection box and the target tracking box of the tracker being within a preset Euclidean threshold range;

S1042: respectively calculating the response graph and the confidence of the first candidate target boxes by an initialized relevant filter of the tracker, and calculating occlusion scores of the first candidate target boxes by the occlusion detector, and screening out the first candidate target boxes of which the confidence is greater than the preset confidence threshold and the occlusion score is less than the preset occlusion score threshold as second candidate target boxes; and S1043: among the second candidate target boxes, selecting the second candidate target box with the largest response value in the response graph and with no occlusion as the predicted tracking box, replacing the target tracking box of the tracker with the predicted tracking box, and performing tracking through the predicted tracking box.

2. The method according to claim 1, wherein the S101 comprises:
acquiring the target to be tracked and determining the category of the target to be tracked by adopting a target detection algorithm to perform target detection on the current panoramic video frame where a target for tracking needs to be determined.

3. The method according to claim 2, wherein after the step of acquiring the target to be tracked, the method further comprises:
identifying the target to be tracked with a bounding box on the panoramic video frame.

4. The method according to claim 3, wherein the step of initializing the tracker comprises:
S1021: acquiring the area where the bounding box of the target to be tracked is located in the current panoramic video frame;
S1022: performing boundary expanding on all boundaries of the area where the bounding box is located according to a preset expansion size to generate an image block;
S1023: taking the image block as a target tracking search area, taking the bounding box of the target to be tracked as the target tracking box, initializing the foreground size and background size of the target tracking search area; and
S1024: initializing the parameters of the relevant filter, and initializing the foreground information and background information related to a color feature of the target tracking search area, and
wherein the step of initializing the occlusion detector comprises:
initializing the foreground size and the background size of the target tracking search area in the occlusion detector; and calculating occlusion scores of the foreground at the initialization time respectively as the reference for subsequent occlusion detection.

5. The method according to claim 4, wherein the step of tracking and detecting the target to be tracked by the tracker to obtain a predicted tracking position of the target to be tracked in the next panoramic video frame comprises:
S1031: generating a feature graph by extracting histogram of oriented gradient HOG features and color features of the image block;
S1032: generating a response graph by filtering the feature graph with the relevant filter; and
S1033: acquiring the position corresponding to the maximum value in the response graph as the predicted tracking position of the target to be tracked in the next panoramic video frame.

6. The method according to claim 1, wherein after the step of tracking the target to be tracked according to the predicted tracking position of the target to be tracked, the method further comprises:
returning to S103 every preset time interval in the process of target tracking.

7. The method according to claim 1, wherein after the S1042, the method further comprises:
determining whether a false detection occurs according to an intersection over union (IOU) value of the second candidate target box and the target tracking box of the tracker, and
in response to the false detection occurred, regarding an occlusion recovery as a failure, and executing the step of detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker.

8. The method according to claim 1, wherein the step of detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker comprises:
S1051: performing target detection on the next panoramic video frame, detecting the target detection boxes and the category of the target, and taking the target detection boxes of which the category of the detected target is consistent with the tracking target category in the tracker as third candidate target boxes;
S1052: calculating IOU values of the third candidate target boxes and the target tracking box of the tracker, taking the third candidate target box with the largest IOU value as the predicted tracking box, and proceeding to S1053; and in response to the IOU values less than a preset IOU threshold, regarding the tracking recovery as a failure, and returning to S101 to re-perform detecting and tracking; and
S1053: taking the position and size of the predicted tracking box as the initialization position and size for the restart of the tracker to restart the tracker, and regarding the tracking recovery as successful.

9. The method according to claim 8, wherein before the S1052, the method further comprises:

S1054: determining whether the false detection occurred, in response to the false detection occurred, executing S1055, and in response to the false detection not occurred, executing S1052;

S1055: selecting the third candidate target boxes with the smallest size difference as fourth candidate target boxes according to the size difference between the third candidate target boxes and the target tracking box of the tracker; and S1056: selecting the fourth candidate target box with the smallest distance as the predicted tracking box according to Euclidean distances between the fourth candidate target boxes and the target tracking box of the tracker, and proceeding to S1053; in response to the Euclidean distances greater than a preset Euclidean distance threshold, regarding the tracking recovery as a failure, and returning to S101 to re-perform detecting and tracking.

10. A computer equipment, comprising:
one or more processors;
a memory; and
one or more computer programs, the processor and the memory being connected by a bus, the one or more computer programs being stored in the memory and being configured to be executed by the one or more processors, wherein, the computer program, when executed by the processor, enabling the processor to execute a target tracking method for the panoramic video;
wherein the target tracking method for the panoramic video comprises:

S101: performing target detection on a current panoramic video frame where a target for tracking needs to be determined to acquire a target to be tracked;

S102: initializing a tracker and an occlusion detector, taking a bounding box of the target to be tracked as a target tracking box of the tracker, and taking the category of the target to be tracked as the tracking target category of the tracker;

S103: tracking and detecting the target to be tracked by the tracker to obtain a predicted tracking position of the target to be tracked in the next panoramic video frame, calculating the confidence of the predicted tracking position, and calculating an occlusion score of the predicted tracking position by the occlusion detector;

S104: determining whether the confidence of the predicted tracking position is greater than a preset confidence threshold, and determining whether the occlusion score of the predicted tracking position is greater than a preset occlusion score threshold;

in response to the confidence of the predicted tracking position greater than the preset confidence threshold, tracking the target to be tracked according to the predicted tracking position of the target to be tracked;

in response to the confidence of the predicted tracking position less than the preset confidence threshold, and the occlusion score of the predicted tracking position greater than the preset occlusion score threshold, detecting the category of the target and target detection boxes in the next panoramic video frame, re-determining a predicted tracking box according to the category of the target, the target detection boxes and tracking information in the tracker, and replacing the target tracking box of the tracker with the predicted tracking box to perform tracking through the predicted tracking box; and/or, in response to the confidence of the predicted tracking position less than the preset confidence threshold, and the occlusion score of the predicted tracking position less than the preset occlusion score threshold, detecting the category of the target and target detection boxes in the next panoramic video frame, re-determining a predicted tracking box according to the category of the target, the target detection boxes and tracking information in the tracker, and taking the position and size of the predicted tracking box as the initialization position and size for the restart of the tracker to restart the tracker, wherein the step of detecting the category of the target and target detection boxes in the next panoramic video frame, re-determining a predicted tracking box according to the category of the target, the target detection boxes and tracking information in the tracker, and replacing the target tracking box of the tracker with the predicted tracking box to perform tracking through the predicted tracking box comprises:

S1041: performing target detection on the next panoramic video frame, detecting the target detection boxes and the category of the target, screening the target detection boxes according to screening conditions, and taking the target detection boxes meeting the screening conditions as first candidate target boxes, wherein the screening conditions comprise: the category of the target detected being consistent with the tracking target category in the tracker; the size difference between the detected target detection box and the target tracking box of the tracker being within a preset size threshold range; and Euclidean distance difference between the detected target detection box and the target tracking box of the tracker being within a preset Euclidean threshold range;

S1042: respectively calculating the response graph and the confidence of the first candidate target boxes by an initialized relevant filter of the tracker, and calculating occlusion scores of the first candidate target boxes by the occlusion detector, and screening out the first candidate target boxes of which the confidence is greater than the preset confidence threshold and the occlusion score is less than the preset occlusion score threshold as second candidate target boxes; and S1043: among the second candidate target boxes, selecting the second candidate target box with the largest response value in the response graph and with no occlusion as the predicted tracking box, replacing the target tracking box of the tracker with the predicted tracking box, and performing tracking through the predicted tracking box.

11. A panoramic camera, comprising the computer equipment according to claim 10.

12. The computer equipment according to claim 10, wherein the S101 comprises:
acquiring the target to be tracked and determining the category of the target to be tracked by adopting a target detection algorithm to perform target detection on the current panoramic video frame where a target for tracking needs to be determined.

13. The computer equipment according to claim 12, wherein after the step of acquiring the target to be tracked, the method further comprises:
identifying the target to be tracked with a bounding box on the panoramic video frame.

14. The computer equipment according to claim 13, wherein the step of initializing the tracker comprises:

S1021: acquiring the area where the bounding box of the target to be tracked is located in the current panoramic video frame;

S1022: performing boundary expanding on all boundaries of the area where the bounding box is located according to a preset expansion size to generate an image block;

S1023: taking the image block as a target tracking search area, taking the bounding box of the target to be tracked as the target tracking box, initializing the foreground size and background size of the target tracking search area; and S1024: initializing the parameters of the relevant filter, and initializing the foreground information and background information related to a color feature of the target tracking search area;

wherein the step of initializing the occlusion detector comprises:

initializing the foreground size and the background size of the target tracking search area in the occlusion detector; and calculating occlusion scores of the foreground at the initialization time respectively as the reference for subsequent occlusion detection.

15. The computer equipment according to claim 14, wherein the step of tracking and detecting the target to be tracked by the tracker to obtain a predicted tracking position of the target to be tracked in the next panoramic video frame comprises:

S1031: generating a feature graph by extracting histogram of oriented gradient HOG features and color features of the image block;

S1032: generating a response graph by filtering the feature graph with the relevant filter; and S1033: acquiring the position corresponding to the maximum value in the response graph as the predicted tracking position of the target to be tracked in the next panoramic video frame.

16. The computer equipment according to claim 10, wherein after the step of tracking the target to be tracked according to the predicted tracking position of the target to be tracked, the method further comprises:

returning to S103 every preset time interval in the process of target tracking.

17. The computer equipment according to claim 10, wherein after the S1042, the method further comprises:

determining whether a false detection occurs according to an intersection over union (IOU) value of the second candidate target box and the target tracking box of the tracker, and in response to the false detection occurred, regarding an occlusion recovery as a failure, and executing the step of detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker.

18. The computer equipment according to claim 10, wherein the step of detecting the category of the target and the target detection boxes in the next panoramic video frame, re-determining a predicted tracking box according to the category of the target, the target detection boxes and the tracking information in the tracker, and taking the position and size of the predicted tracking box as the initialization position and size for the restart of the tracker to restart the tracker comprises:

S1051: performing target detection on the next panoramic video frame, detecting the target detection boxes and the category of the target, and taking the target detection boxes of which the category of the detected target is consistent with the tracking target category in the tracker as third candidate target boxes;

S1052: calculating IOU values of the third candidate target boxes and the target tracking box of the tracker, taking the third candidate target box with the largest IOU value as the predicted tracking box, and proceeding to S1053; and in response to the IOU values less than a preset IOU threshold, regarding the tracking recovery as a failure, and returning to S101 to re-perform detecting and tracking; and S1053: taking the position and size of the predicted tracking box as the initialization position and size for the restart of the tracker to restart the tracker, and regarding the tracking recovery as successful, and wherein before the S1052, the method further comprises:

S1054: determining whether the false detection occurred, in response to the false detection occurred, executing S1055, and in response to the false detection not occurred, executing S1052;

S1055: selecting the third candidate target boxes with the smallest size difference as fourth candidate target boxes according to the size difference between the third candidate target boxes and the target tracking box of the tracker; and S1056: selecting the fourth candidate target box with the smallest distance as the predicted tracking box according to Euclidean distances between the fourth candidate target boxes and the target tracking box of the tracker, and proceeding to S1053; in response to the Euclidean distances greater than a preset Euclidean distance threshold, regarding the tracking recovery as a failure, and returning to S101 to re-perform detecting and tracking.

* * * * *